US010877126B2

(12) United States Patent
Zhang et al.

(10) Patent No.: US 10,877,126 B2
(45) Date of Patent: Dec. 29, 2020

(54) AOA DETERMINATION METHOD AND ASSOCIATED WIRELESS COMMUNICATION DEVICE AND RADIO BASE STATION

(71) Applicant: Telefonaktiebolaget LM Ericsson (publ), Stockholm (SE)

(72) Inventors: Yipeng Zhang, Beijing (CN); Wenming Cui, Beijing (CN); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 388 days.

(21) Appl. No.: 15/546,385

(22) PCT Filed: Jan. 30, 2015

(86) PCT No.: PCT/CN2015/071950
§ 371 (c)(1),
(2) Date: Jul. 26, 2017

(87) PCT Pub. No.: WO2016/119216
PCT Pub. Date: Aug. 4, 2016

(65) Prior Publication Data
US 2018/0024219 A1    Jan. 25, 2018

(51) Int. Cl.
*G01S 3/28* (2006.01)
*G01S 3/46* (2006.01)
(52) U.S. Cl.
CPC . *G01S 3/28* (2013.01); *G01S 3/46* (2013.01)
(58) Field of Classification Search
CPC .................................... G01S 3/28; G01S 3/46
(Continued)

(56) References Cited

U.S. PATENT DOCUMENTS 6,459,903 B1 * 10/2002 Lee .................... H04W 64/00
342/457
2002/0011952 A1   1/2002 Pack et al.
(Continued)

FOREIGN PATENT DOCUMENTS

| CN | 101431354 A | 5/2009 |
| WO | 9514936 A1 | 6/1995 |
| WO | 0189254 A1 | 11/2001 |

OTHER PUBLICATIONS

PCT Notification of Transmittal of the International Search Report and the Written Opinion of the International Searching Authority, or the Declaration for International application No. PCT/CN2015/071950—dated Jul. 17, 2015.
(Continued)

*Primary Examiner* — Bo Fan
(74) *Attorney, Agent, or Firm* — Sage Patent Group

(57) ABSTRACT

The present disclosure provides a method implemented in a wireless communication device for determining an Angle of Arrival (AOA) of a wireless signal received at the wireless communication device. The method comprises estimating the AOA of the wireless signal, determining that the estimated AOA is ambiguous and acquiring signal strength measurements for the wireless signal received at two other wireless communication devices, which are located substantively symmetrically about a normal of the wireless communication device's antenna array. The method further comprises disambiguating the estimated AOA based on a comparison of the acquired signal strength measurements. The present disclosure also provides the wireless communication device as well as a Radio Base Station (RBS) comprising the wireless communication device.

8 Claims, 5 Drawing Sheets

(58) Field of Classification Search
USPC .................................................. 342/145, 417
See application file for complete search history.

(56) References Cited

U.S. PATENT DOCUMENTS

| | | | |
|---|---|---|---|
| 2009/0243933 A1* | 10/2009 | Shirakawa | G01S 3/74 |
| | | | 342/417 |
| 2012/0015669 A1 | 1/2012 | Qin et al. | |
| 2014/0062809 A1* | 3/2014 | Jeschke | H01Q 1/3291 |
| | | | 343/713 |
| 2014/0210665 A1 | 7/2014 | Desai et al. | |
| 2015/0070231 A1* | 3/2015 | Park | H01Q 21/08 |
| | | | 343/777 |

OTHER PUBLICATIONS

Extended European Search Report for Application No. EP15879424.8, dated Sep. 10, 2018, 6 pages.

\* cited by examiner

US 10,877,126 B2

AOA DETERMINATION METHOD AND ASSOCIATED WIRELESS COMMUNICATION DEVICE AND RADIO BASE STATION

PRIORITY

This nonprovisional application is a U.S. National Stage Filing under 35 U.S.C. § 371 of International Patent Application Serial No. PCT/CN2015/071950 filed Jan. 30, 2015, and entitled "AOA Determination Method And Associated Wireless Communication Device And Radio Base Station."

TECHNICAL FIELD

The present disclosure generally relates to the technical field of wireless communications, and particularly, to a method and a wireless communication device for determining an Angle of Arrival (AOA) of a wireless signal received at the wireless communication device and a Radio Base Station (RBS) comprising the wireless communication device.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

For a wireless communication device equipped with an antenna array, it is possible to estimate an AOA of a wireless signal received at the wireless communication device according to the phase difference between adjacent antenna elements of the antenna array.

By way of example, FIG. 1 depicts a Uniform Linear Array (ULA) including more than one uniformly spaced-apart antenna elements arranged in a line. In the figure, each of the antenna elements is denoted as a solid dot. The space between adjacent antenna elements of the antenna array is denoted as d. The AOA of a wireless signal received at the antenna array is denoted as $\theta$ and refers to an angle formed between the normal of the antenna array (indicated by the dotted line in FIG. 1) and the direction in which the wireless signal reaches the antenna array (indicated by arrowed lines in FIG. 1). The phase difference between adjacent antenna elements is equal to $2\pi\lambda/d \sin\theta$.

As one of various AOA estimation approaches that can be found in the prior art (referring to US2012/0015669A1 for example), $\theta$ may be estimated by measuring the phase difference between adjacent antenna elements (denoted as $\emptyset$) and then deriving $\theta$ from the measured phase difference according to the relationship $\emptyset = 2\pi\lambda/d \sin\theta$, $\theta \in [-90°, 90°]$.

To get a well-balanced system performance, it is preferable to set the space between adjacent antenna elements of the antenna array (denoted as d) to one-half wavelength of the received wireless signal (denoted as $0.5\lambda$). However, this is hard to achieve in practical wireless communication systems where multiple frequency bands shall be supported by a single antenna array.

For example, supposing an antenna array is initially designed for operating at 2 GHz frequency band corresponding to a wavelength of $\lambda_1 = 3 \times 10^8 / 2 \times 10^9$ and then reused for 2.6 GHz frequency band corresponding to a wavelength of $\lambda_2 = 3 \times 10^8 / 2.6 \times 10^9$, if the space between adjacent antenna elements of the antenna array (denoted as d) were initially set to one-half wavelength for the 2 GHz frequency band (denoted as $0.5\lambda_1$), it would be $0.65\lambda_2$ for the 2.6 GHz frequency band.

In case d is greater than $0.5\lambda$, the prior art AOA estimation approach might give an ambiguous result. To be specific, when d>$0.5\lambda$, some AOA (denoted as $\theta$) may cause a phase difference $\emptyset$ which is larger than $\pi$ or less than $-\pi$ while another AOA (denoted as $\theta'$ and called fake AOA) gives a phase difference $\emptyset - 2\pi$ or $\emptyset + 2\pi$ which is indistinguishable from the phase difference $\emptyset$. Accordingly, from the measured phase difference $\emptyset$, an ambiguous AOA, which may be either the real AOA $\theta$ or the fake AOA $\theta'$, is estimated.

This phenomenon is further illustrated in FIG. 2 which shows a beamforming pattern characterizing the relationship between possible values of the AOA and corresponding beamforming gain values derived from the possible AOA values. As can be seen from the figure, the peak value of the beamforming gain may take place at both the real AOA $\theta = 45°$ and the fake AOA $\theta' = -56.2°$, and hence either of them may be estimated ambiguously as a result of selecting one of the possible AOA values that corresponds to the peak value of the beamforming gain.

SUMMARY

In view of the foregoing, an object of the present disclosure is to eliminate or at least alleviate the drawback of the prior art AOA estimation approach.

According to a first aspect of the present disclosure, there is provided a method implemented in a wireless communication device for determining an AOA of a wireless signal received at the wireless communication device. The method comprises estimating the AOA of the wireless signal, determining that the estimated AOA is ambiguous and acquiring signal strength measurements for the wireless signal received at two other wireless communication devices, which are located substantively symmetrically about a normal of the wireless communication device's antenna array. The method further comprises disambiguate the estimated AOA based on a comparison of the acquired signal strength measurements.

Through the comparison of the acquired signal strength measurements for the wireless signals received at the other two wireless communication devices, additional information is available at the wireless communication device for disambiguating the estimated AOA. Accordingly, the real AOA instead of the fake one can be determined by the wireless communication device.

In an embodiment, the determining that the estimated AOA is ambiguous may comprise determining a credible AOA range and determining that the estimated AOA is ambiguous when the estimated AOA falls outside the credible AOA range. No AOA in the credible AOA range has a mirrored AOA and no mirrored AOA of an AOA appears in the range.

In an embodiment, the credible AOA range may be $[-\theta_{cred}, \theta_{cred}]$. Here, $\theta_{cred}$ is the minimum one of $$\arcsin\left(\frac{\lambda}{2d}\right) \text{ and } \arcsin\left(-\sin(\theta_{max}) + \frac{\lambda}{d}\right),$$

λ denotes a wavelength of the wireless signal, d denotes a space between adjacent antenna elements of the wireless communication device's antenna array and $\theta_{max}$ denotes a maximum possible AOA for the wireless communication device.

With the credible AOA range determined according to its conceptual or mathematical definition, it is easy to determine whether the estimated AOA is ambiguous by checking whether it falls outside the credible AOA range.

In an embodiment, the disambiguating the estimated AOA based on the comparison of the acquired signal strength measurements may comprise determining the AOA as the estimated AOA if the comparison of the acquired signal strength measurements indicates that the wireless signal is from one side of the normal of the wireless communication device's antenna array and the sign of the estimated AOA indicates that the wireless signal is from the same side of the normal. If the comparison of the acquired signal strength measurements indicates that the wireless signal is from one side of the normal of the wireless communication device's antenna array while the sign of the estimated AOA indicates that the wireless signal is from the other side of the normal, the AOA may be determined as a mirrored AOA of the estimated AOA.

In this manner, the fake AOA can be identified and corrected as the real one, if there is an inconsistency between the indications of the comparison of the acquired signal strength measurements and the sign of the estimated AOA.

In an embodiment, the mirrored AOA of the estimated AOA may be determined according to the following:

$$\begin{cases} \theta = \arcsin\left(\sin(\theta_{est}) + \frac{\lambda}{d}\right), & \theta_{est} < 0 \\ \theta = \arcsin\left(\sin(\theta_{est}) - \frac{\lambda}{d}\right), & \theta_{est} > 0 \end{cases}.$$

Here, $\theta$ denotes the mirrored AOA, $\theta_{est}$ denotes the estimated AOA, λ denotes a wavelength of the wireless signal and d denotes a space between adjacent antenna elements of the wireless communication device's antenna array.

In an embodiment, if the signal strength measurement for the wireless signal received at one of the other two wireless communication devices is higher than the signal strength measurement for the wireless signal received at the other of the other two wireless communication devices, the comparison of the acquired signal strength measurements may indicate that the wireless signal is from one side of the normal at which said one of the other two wireless communication devices is located.

In an embodiment, the wireless communication device and the other two wireless communication devices may respectively correspond to three sectors of an RBS and the sectors corresponding to the other two wireless communications may be respectively adjacent to the sector corresponding to the wireless communication device.

In this manner, the proposed method can be readily implemented in an RBS having at least three sectors and the real AOA can be obtained by means of multi-sector co-estimation.

According to a second aspect of the present disclosure, there is provided a wireless communication device for determining an AOA of a wireless signal received at the wireless communication device. The wireless communication device comprises an AOA estimating section, an AOA ambiguity determining section, a signal strength measurement acquiring section and an AOA disambiguating section. The AOA estimating section is configured to estimate the AOA of the wireless signal. The AOA ambiguity determining section is configured to determine that the estimated AOA is ambiguous. The signal strength measurement acquiring section is configured to acquire signal strength measurements for the wireless signal received at two other wireless communication devices, which are located substantively symmetrically about a normal of the wireless communication device's antenna array. The AOA disambiguating section is configured to disambiguate the estimated AOA based on a comparison of the acquired signal strength measurements.

According to a third aspect of the present disclosure, there is provided a wireless communication device for determining an AOA of a wireless signal received at the wireless communication device. The wireless communication device comprises a transceiver with an antenna array, a processor and a memory. The memory has machine-readable program code stored therein. When executed by the processor, the program code causes the wireless communication device to perform the method according to the first aspect of the present disclosure.

According to a fourth aspect of the present disclosure, there is provided a wireless communication device for determining an AOA of a wireless signal received at the wireless communication device. The wireless communication device comprises means adapted to estimate the AOA of the wireless signal, to determine that the estimated AOA is ambiguous and to acquire signal strength measurements for the wireless signal received at two other wireless communication devices, which are located substantively symmetrically about a normal of the wireless communication device's antenna array. The means is further adapted to disambiguate the estimated AOA based on a comparison of the acquired signal strength measurements.

According to a fifth aspect of the present disclosure, there is a provided a RBS comprising the wireless communication device according to any of the second to the fourth aspects of the present disclosure.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, Application Specific Integrated Circuits (ASICs), Programmable Logical Arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 3:
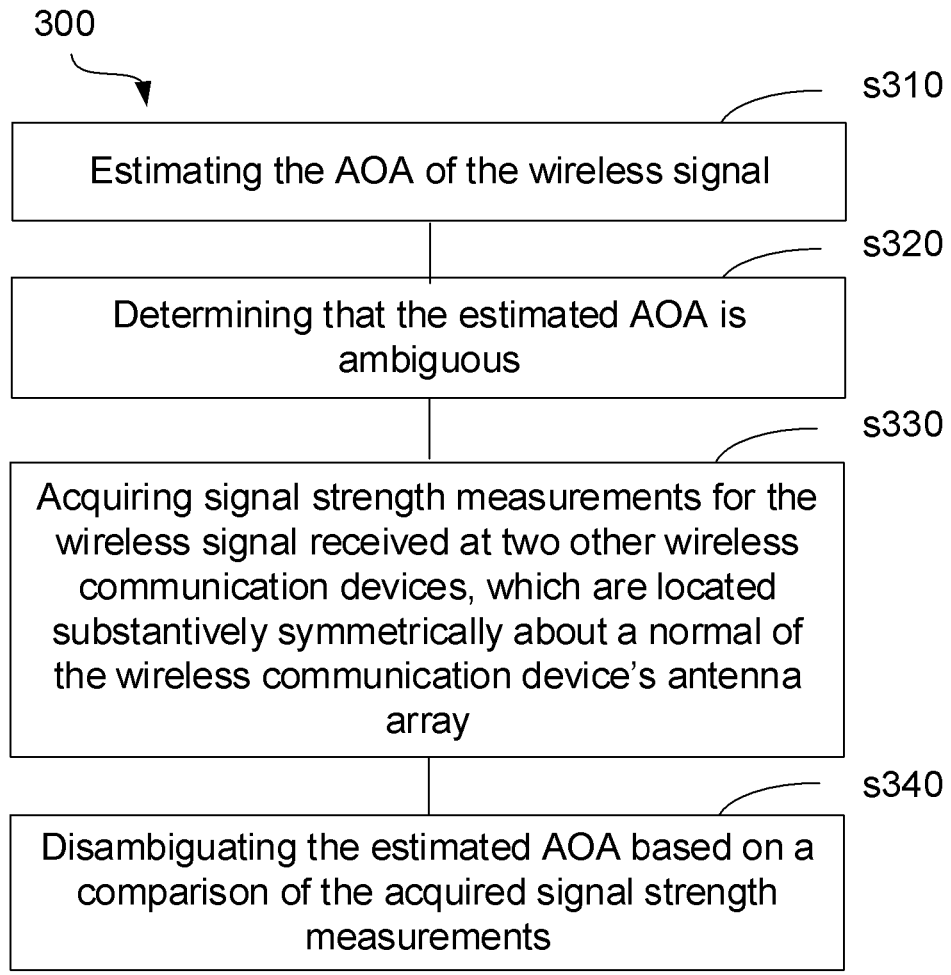
FIG. 3 is a flowchart illustrating operations of a method implemented in a wireless communication device according to the present disclosure.

FIG. 3 schematically illustrates a method 300 implemented in a wireless communication device for determining an AOA of a wireless signal received at the wireless communication device according to the present disclosure.

As illustrated, initially, the AOA of the wireless signal is estimated at block s310. As mentioned above, the AOA estimation can be done by exploiting the approach described in US2012/0015669A1. Nonetheless, the present disclosure is not limited in this regard. Rather, various other approaches that have been developed till now and will be developed in the future can also be used for the AOA estimation at block s310. For the sake of brevity, these approaches will be not enumerated here.

Figure 4:
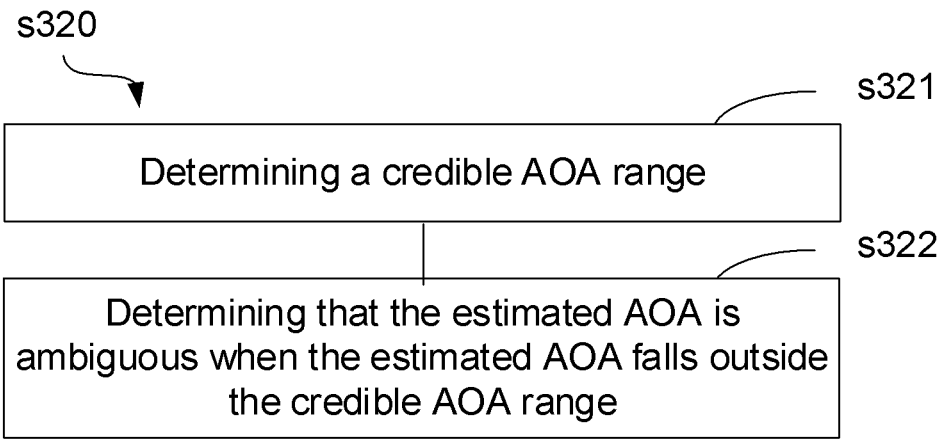
FIG. 4 is a flowchart illustrating operations of a step shown in FIG. 3.

Then, at block s320, it is determined that the estimated AOA is ambiguous. In an embodiment, the operation shown at block s320 in FIG. 3 may comprise operations shown at blocks s321 and s322 in FIG. 4. At block s321, a credible AOA range is determined. At block s322, it is determined that the estimated AOA is ambiguous when the estimated AOA falls outside the credible AOA range.

As mentioned above, when d>0.5λ, some AOA (denoted as θ) may cause a phase difference Ø which is larger than π or less than −π while another AOA (denoted as θ' and called fake AOA) gives a phase difference Ø−2π or Ø+2π which is indistinguishable from the phase difference Ø. Mathematically, the relationship between θ and θ' can be expressed as follows $$\begin{cases} 2\pi\frac{d}{\lambda}\sin(\theta) - 2\pi = 2\pi\frac{d}{\lambda}\sin(\theta'), & 2\pi\frac{d}{\lambda}\sin(\theta) > \pi \\ 2\pi\frac{d}{\lambda}\sin(\theta) + 2\pi = 2\pi\frac{d}{\lambda}\sin(\theta'), & 2\pi\frac{d}{\lambda}\sin(\theta) < -\pi \end{cases} \quad (1)$$

Accordingly, θ' can be calculated from θ based on the following formula $$\begin{cases} \theta' = \arcsin\left(\sin(\theta) - \frac{\lambda}{d}\right), & \theta > \arcsin\left(\frac{\lambda}{2d}\right) \\ \theta' = \arcsin\left(\sin(\theta) + \frac{\lambda}{d}\right), & \theta < -\arcsin\left(\frac{\lambda}{2d}\right) \end{cases} \quad (2)$$

In the sense that θ and θ' correspond to indistinguishable phase differences, θ and θ' are mirrored AOAs of each other and the above formula holds true if θ and θ' are interchanged.

In this regard, to ensure that any AOA in the credible AOA range is unambiguous, the credible AOA range shall be defined in such a manner that no AOA in the range has a mirrored AOA and no mirrored AOA of an AOA appears in the range.

By way of illustration rather than limitation, the credible AOA range may be mathematically determined as [−θ$_{cred}$, θ$_{cred}$], which is symmetric about the normal of the wireless communication device's antenna array. Here, θ$_{cred}$ is the minimum one of $$\arcsin\left(\frac{\lambda}{2d}\right) \text{ and } \arcsin\left(-\sin(\theta_{max}) + \frac{\lambda}{d}\right).$$

θ$_{max}$ denotes a maximum possible AOA for the wireless communication device and may take a value which is greater than 0° and less than or equal to 90°. For example, if θ$_{max}$ takes the value of 75° and d=0.65λ, θ$_{cred}$ can be calculated as 34.9°.

With the credible AOA range determined according to its conceptual or mathematical definition, it is easy to determine whether the estimated AOA is ambiguous by checking whether it falls outside the credible AOA range.

Figure 1:
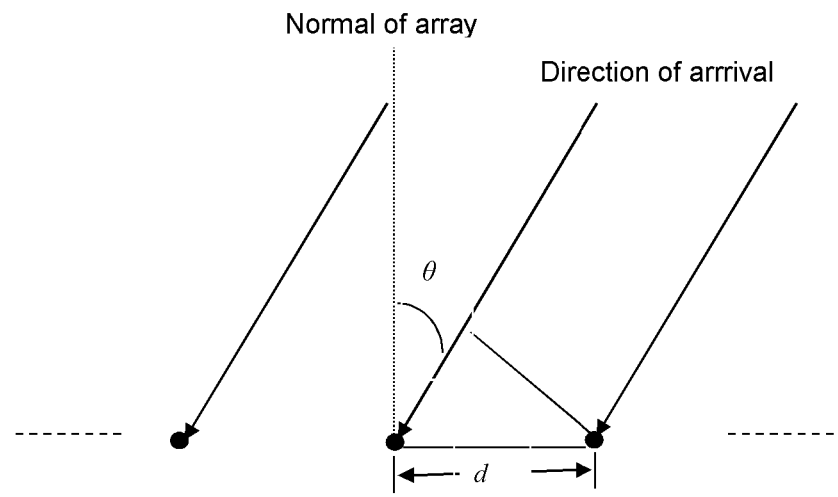
FIG. 1 is a diagram illustrating an antenna array and an AOA of a wireless signal arriving at the antenna array.
Figure 2:
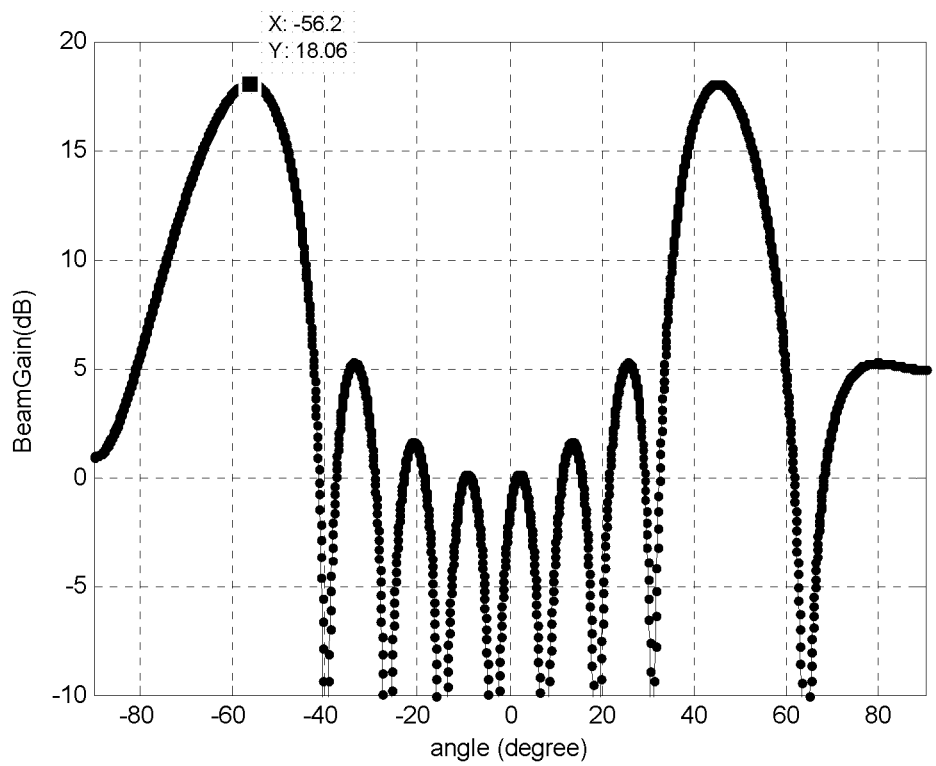
FIG. 2 is a diagram illustrating a beamforming pattern wherein both a real AOA and a fake AOA correspond to a peak value of a beamforming gain.

Referring back to FIG. 1, after it is determined that the estimated AOA is ambiguous at block s320, signal strength measurements for the wireless signal received at two other wireless communication devices, which are located substantively symmetrically about the normal of the wireless communication device's antenna array, are acquired at block s330. Subsequently, the estimated AOA is disambiguated based on a comparison of the acquired signal strength measurements at block s340.

Through the comparison of the acquired signal strength measurements for the wireless signals received at the other two wireless communication devices, additional information is available at the wireless communication device for disambiguating the estimated AOA. Accordingly, the real AOA instead of the fake one can be determined by the wireless communication device.

In practical implementation, the wireless communication device and the other two wireless communication devices may respectively correspond to three sectors of an RBS and the sectors corresponding to the other two wireless communications may be respectively adjacent to the sector corresponding to the wireless communication device. In practical implementation, the signal strength measurements for the wireless signal may be acquired as power measurements for any kind of uplink channels specific to the wireless system in which the RBS operates. By way of example, in a Long-Term Evolution (LTE) system, the signal strength measurements may be power measurements for Physical Uplink Shared CHannel (PUSCH), Physical Uplink Control CHannel (PUCCH) or Sounding Reference Signal (SRS).

In this manner, the proposed method 300 can be readily implemented in an RBS having at least three sectors and the real AOA can be obtained by means of multi-sector co-estimation.

Figure 5:
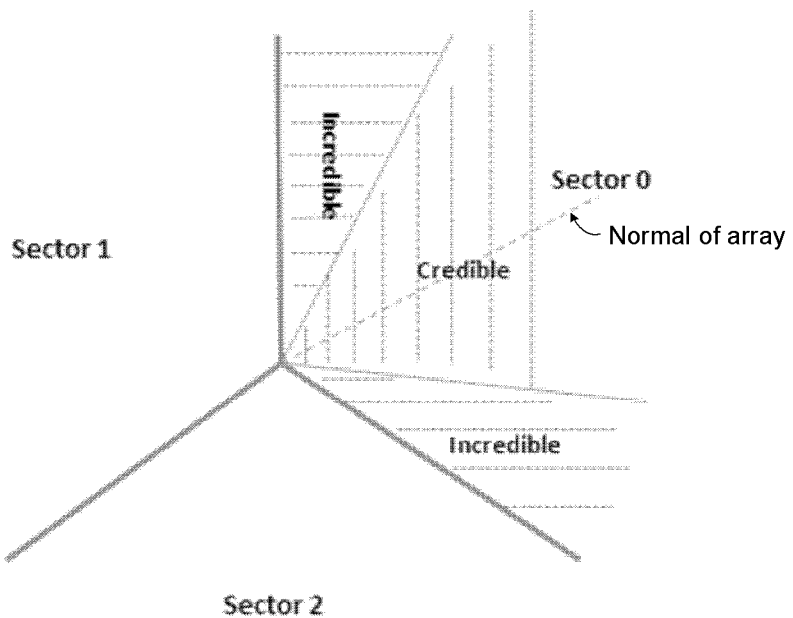
FIG. 5 is a diagram illustrating a three-sector scenario and a credible AOA range for one of the three sectors.

For illustration, FIG. 5 depicts a three-sector scenario where the wireless communication device corresponds to sector 0 and the other two wireless communication devices respectively correspond to sectors 1 and 2. Also, in FIG. 5, the credible AOA range for the wireless communication device corresponding to section 0 is illustrated.

Figure 6:
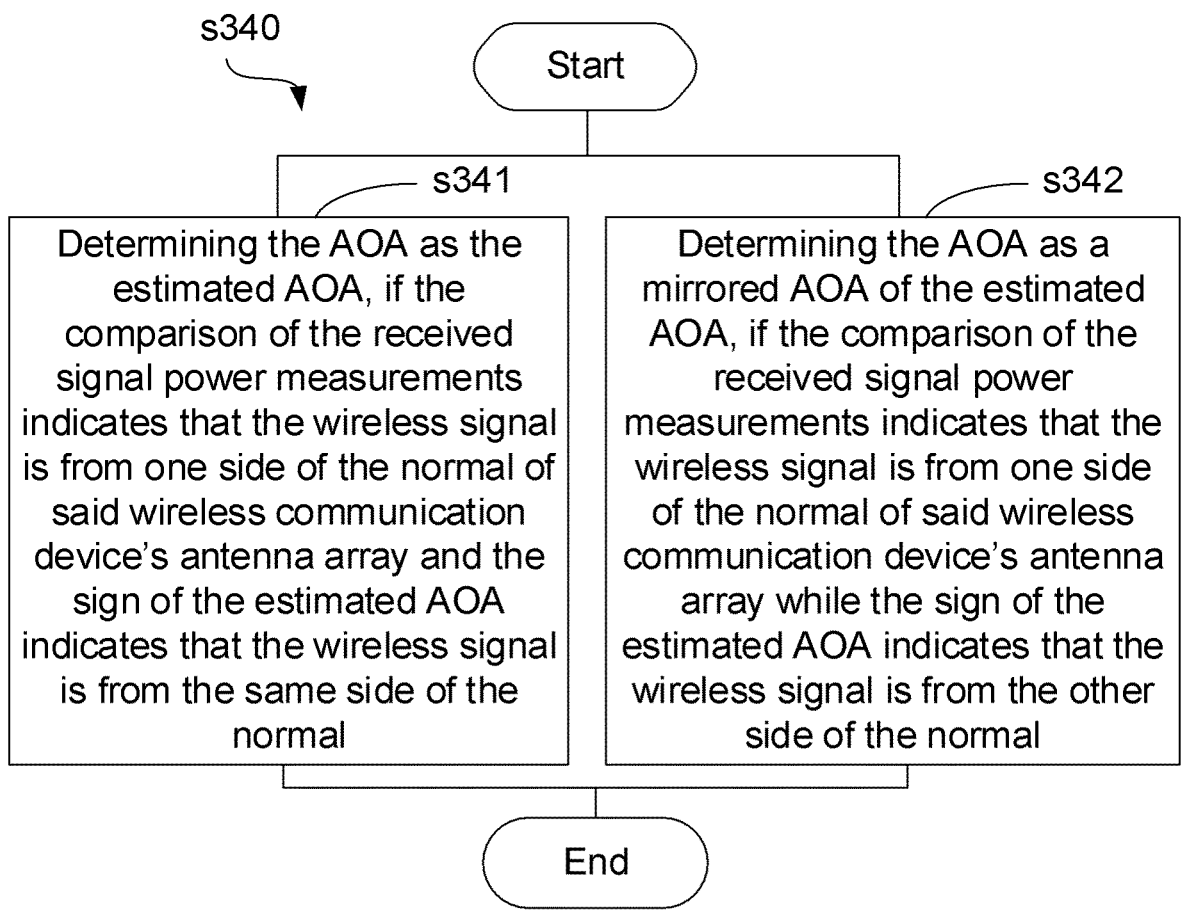
FIG. 6 is a flowchart illustrating operations of another step shown in FIG. 3.

In an embodiment, the operation shown at block s340 in FIG. 3 may comprise operations shown at blocks s341 and s342 in FIG. 6. At block s341, the AOA is determined as the estimated AOA, if the comparison of the acquired signal strength measurements indicates that the wireless signal is from one side of the normal of the wireless communication device's antenna array and the sign of the estimated AOA indicates that the wireless signal is from the same side of the normal.

By way of example, if the signal strength measurement for the wireless signal received at one of the other two wireless communication devices is higher than the signal strength measurement for the wireless signal received at the other of the other two wireless communication devices, the comparison of the acquired signal strength measurements may indicate that the wireless signal is from one side of the normal at which said one of the other two wireless communication devices is located.

At block s342, the AOA is determined as the mirrored AOA of the estimated AOA, if the comparison of the acquired signal strength measurements indicates that the wireless signal is from one side of the normal of the wireless communication device's antenna array while the sign of the estimated AOA indicates that the wireless signal is from the other side of the normal.

As discussed with respect to the above formula (2), the mirrored AOA of the estimated AOA may be determined as follows:

$$\begin{cases} \theta = \arcsin\left(\sin(\theta_{est}) + \frac{\lambda}{d}\right), & \theta_{est} < 0 \\ \theta = \arcsin\left(\sin(\theta_{est}) - \frac{\lambda}{d}\right), & \theta_{est} > 0 \end{cases},$$

Here, $\theta$ denotes the mirrored AOA and $\theta_{est}$ denotes the estimated AOA.

In this manner, the fake AOA can be identified and corrected as the real one, if there is an inconsistency between the indications of the comparison of the acquired signal strength measurements and the sign of the estimated AOA.

To facilitate understanding of the operations shown in FIG. 6, description will be given with reference to FIG. 7 for explaining how to disambiguate the estimated AOA that falls outside the credible AOA range shown in FIG. 5.

Figure 7:
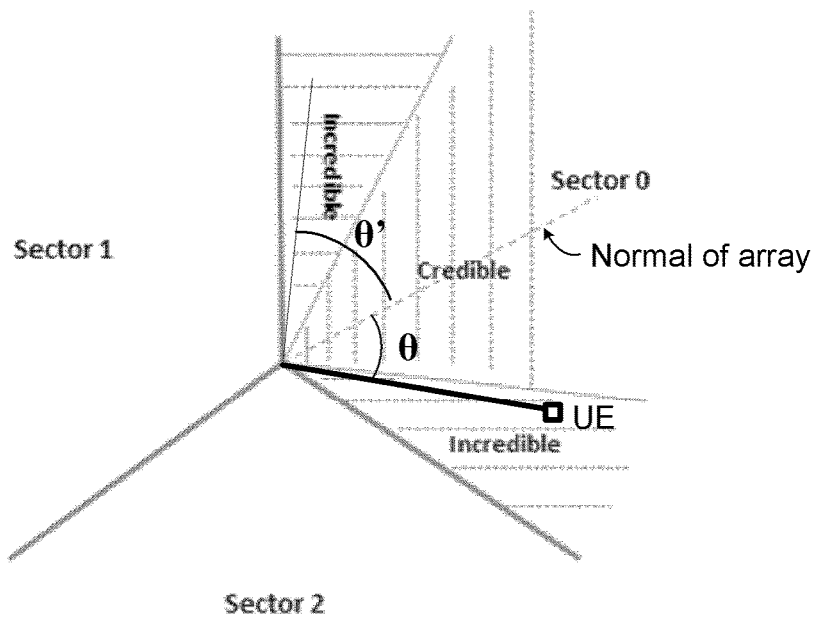
FIG. 7 is a diagram illustrating an estimated AOA θ falling outside the credible AOA range and its mirrored AOA θ'.

Specifically, in FIG. 7, the normal of the antenna array of sector 0's wireless communication device is denoted by a dashed line. The estimated AOA for a wireless signal received by sector 0's wireless communication device from a User Equipment (UE) may be either the real AOA $\theta$ or the fake AOA $\theta'$.

By way of example, the estimated AOA may be the real AOA $\theta=45°$, the sign of which indicates that the wireless signal is from one side of the normal at which sector 2's wireless communication device is located.

Meanwhile, the signal strength measurement for the wireless signal received at sector 1's wireless communication device is lower than the signal strength measurement for the wireless signal received at sector 2's wireless communication device, and hence the comparison of the signal strength measurements indicates that the wireless signal is from the same side of the normal at which sector 2's wireless communication device is located. In this case, the AOA is directly determined as the estimated AOA $\theta=45°$.

On the other hand, the estimated AOA may be the fake AOA $\theta'=-56.2°$, the sign of which indicates that the wireless signal is from one side of the normal at which sector 1's wireless communication device is located. However, because the signal strength measurement for the wireless signal received at sector 1's wireless communication device is lower than the signal strength measurement for the wireless signal received at sector 2's wireless communication device, the comparison of the signal strength measurements indicates that the wireless signal is from the other side of the normal at which sector 2's wireless communication device is located. In this case, the AOA is determined as the mirrored AOA $\theta=45°$ of the estimated AOA $\theta'=-56.2°$.

In practical implementation, the AOA may be estimated periodically. Due to noise, inference and channel variance, the estimated AOA may fluctuate over time. To mitigate the fluctuation, the estimated AOA may be filtered as follows:

$$\bar{\theta}(n)=\beta\cdot\bar{\theta}(n-1)+(1-\beta)\cdot\theta(n).$$

Here, $\bar{\theta}(n)$ denotes the filtered estimated AOA, $\beta$ denotes a filtering factor which is greater than or equal to 0 and less than 1, $\bar{\theta}(n-1)$ denotes the last filtered estimated AOA and $\theta(n)$ denotes the latest estimated AOA.

Correspondingly to the above-described method 300, a wireless communication device may be provided for determining an AOA of a wireless signal received at the wireless communication device. The wireless communication device comprises means adapted to estimate the AOA of the wireless signal, to determine that the estimated AOA is ambiguous and to acquire signal strength measurements for the wireless signal received at two other wireless communication devices, which are located substantively symmetrically about a normal of the wireless communication device's antenna array. The means is further adapted to disambiguate the estimated AOA based on a comparison of the acquired signal strength measurements.

In the following, a functional architecture of the wireless communication device according to an example wireless communication device 800 of the present disclosure will be given with reference to FIG. 8.

Figure 8:
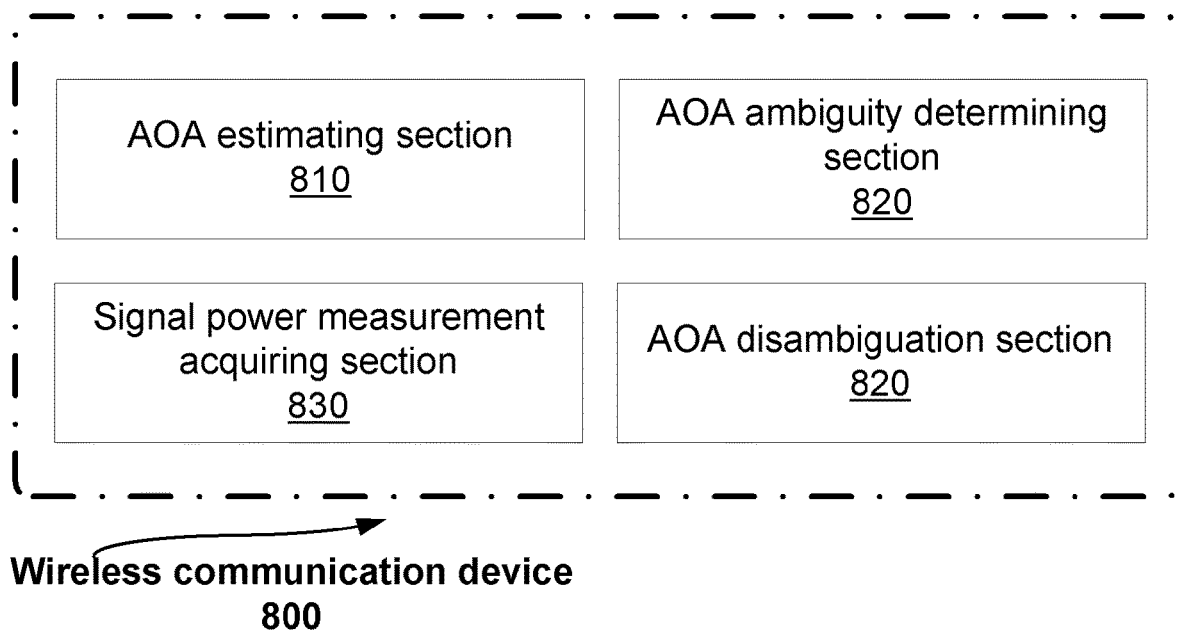
FIG. 8 is a block diagram illustrating functional modules of a wireless communication device according to the present disclosure.

As shown in FIG. 8, the wireless communication device 800 comprises an AOA estimating section 810, an AOA ambiguity determining section 820, a signal strength measurement acquiring section 830 and an AOA disambiguating section 840. The AOA estimating section 810 is configured to estimate the AOA of the wireless signal. The AOA ambiguity determining section 820 is configured to determine that the estimated AOA is ambiguous. The signal strength measurement acquiring section 830 is configured to acquire signal strength measurements for the wireless signal received at two other wireless communication devices, which are located substantively symmetrically about a normal of said wireless communication device's antenna array. The AOA disambiguating section 840 is configured to disambiguate the estimated AOA based on a comparison of the acquired signal strength measurements.

In an embodiment, the AOA ambiguity determining section 820 may be configured to determine a credible AOA range and to determine that the estimated AOA is ambiguous when the estimated AOA falls outside the credible AOA range. No AOA in the credible AOA range has a mirrored AOA and no mirrored AOA of an AOA appears in the range.

In an embodiment, the credible AOA range may be [θ$_{cred}$, θ$_{cred}$]. Here, θ$_{cred}$ is the minimum one of $$\arcsin\left(\frac{\lambda}{2d}\right) \text{ and } \arcsin\left(-\sin(\theta_{max}) + \frac{\lambda}{d}\right),$$

λ denotes a wavelength of the wireless signal, d denotes a space between adjacent antenna elements of said wireless communication device's antenna array and θ$_{max}$ denotes a maximum possible AOA for the wireless communication device.

In an embodiment, the AOA disambiguating section 840 may be configured to determine the AOA as the estimated AOA if the comparison of the acquired signal strength measurements indicates that the wireless signal is from one side of the normal of the wireless communication device's antenna array while the sign of the estimated AOA indicates that the wireless signal is from the same side of the normal. If the comparison of the acquired signal strength measurements indicates that the wireless signal is from one side of the normal of the wireless communication device's antenna array while the sign of the estimated AOA indicates that the wireless signal is from the other side of the normal, the AOA may be determined as a mirrored AOA of the estimated AOA.

In an embodiment, the mirrored AOA of the estimated AOA may be determined according to the following:

$$\begin{cases} \theta = \arcsin\left(\sin(\theta_{est}) + \frac{\lambda}{d}\right), & \theta_{est} < 0 \\ \theta = \arcsin\left(\sin(\theta_{est}) - \frac{\lambda}{d}\right), & \theta_{est} > 0 \end{cases}.$$

Here, θ denotes the mirrored AOA, θ$_{est}$ denotes the estimated AOA, λ denotes a wavelength of the wireless signal and d denotes a space between adjacent antenna elements of the wireless communication device's antenna array.

In an embodiment, if the signal strength measurement for the wireless signal received at one of the other two wireless communication devices is higher than the signal strength measurement for the wireless signal received at the other of the other two wireless communication devices, the comparison of the acquired signal strength measurements may indicate that the wireless signal is from one side of the normal at which said one of the other two wireless communication devices is located.

In an embodiment, the wireless communication device 800 and the other two wireless communication devices respectively correspond to three sectors of a Radio Base Station (RBS) and the sectors corresponding to the other two wireless communications are respectively adjacent to the sector corresponding to the wireless communication device.

In other words, an RBS may be provided with the wireless communication device 800 and two other wireless communication devices. These three wireless communication devices respectively correspond to three sectors of the RBS, and the sectors corresponding to the other two wireless communication devices are respectively adjacent to the sector corresponding to the wireless communication device 800.

In light of the above-described functional architecture of the wireless communication device 800, those skilled in the art can conceive various implementations, wherein the functional blocks of the wireless communication device 800 may be implemented in hardware, software, and/or firmware.

As an exemplary implementation, the above-described sections may be implemented separately as suitable dedicated circuits. Nevertheless, they can also be implemented using any number of dedicated circuits through functional combination or separation. In one embodiment, the above sections may be combined in a single application specific integrated circuit (ASIC).

Figure 9:
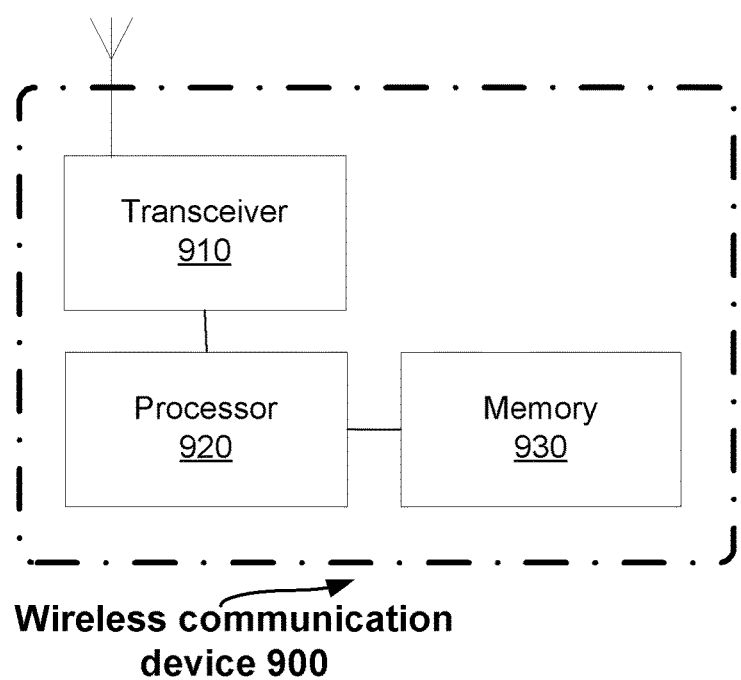
FIG. 9 is a block diagram illustrating an exemplary hardware implementation of a wireless communication device according to the present disclosure.

As an alternative implementation, there may be provided a wireless communication device 900 comprising a transceiver 910 with an antenna array, a processor 920 (including but not limited to a microprocessor, a microcontroller or a Digital Signal Processor (DSP), etc.) coupled to the transceiver 910, and a memory 930 coupled to the processor 920, as illustrated in FIG. 9. The transceiver 910 is for bidirectional wireless communications. The memory 930 stores machine-readable program code. The machine-readable program code may include program instructions that, when executed by the processor 920, enable the wireless communication device 900 to operate in accordance with the exemplary embodiments of this disclosure. For example, the program code and the processor 920 may embody the AOA estimating section 810, the AOA ambiguity determining section 820, the signal strength measurement acquiring section 830 and the AOA disambiguating section 840 to perform the respective operations.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A wireless communication device for determining an Angle of Arrival (AOA) of a wireless signal received at the wireless communication device, the wireless communication device comprising one or more processors configured to:
   estimate the AOA of the wireless signal;
   determine that the estimated AOA is ambiguous based on determining a credible AOA range, wherein the credible AOA range is defined such that no AOA in the credible AOA range has a mirrored AOA and no mirrored AOA of an AOA appears in the credible AOA range, and determining that the estimated AOA is ambiguous when the estimated AOA falls outside the credible AOA range;
   acquire signal strength measurements for the wireless signal received at two other wireless communication devices, which are located substantively symmetrically about a normal of an antenna array of the wireless communication device; and
   disambiguate the estimated AOA based on a comparison of the acquired signal strength measurements.

2. The wireless communication device of claim 1, wherein the credible AOA range is $[-\theta_{cred}, \theta_{cred}]$ where $\theta_{cred}$ is the minimum one of arcsin ($\lambda/2$ d) and arcsin ($-\sin(\theta_{max})+ \lambda/d$), $\lambda$ denotes a wavelength of the wireless signal, d denotes a space between adjacent antenna elements of said wireless communication device's antenna array and $\theta_{max}$ denotes a maximum possible AOA for the wireless communication device.

3. The wireless communication device of claim 1, wherein the one or more processors are configured to
   determine the AOA as the estimated AOA, when the comparison of the acquired signal strength measurements indicates that the wireless signal is from one side of the normal of said wireless communication device's antenna array while the sign of the estimated AOA indicates that the wireless signal is from the same side of the normal, and
   determine the AOA as a mirrored AOA of the estimated AOA, when the comparison of the acquired signal strength measurements indicates that the wireless signal is from one side of the normal of said wireless communication device's antenna array while the sign of the estimated AOA indicates that the wireless signal is from the other side of the normal.

4. The wireless communication device of claim 3, wherein the mirrored AOA of the estimated AOA is determined according to the following:

$$\begin{cases} \theta = \arcsin\left(\sin(\theta_{est}) + \frac{\lambda}{d}\right), & \theta_{est} < 0 \\ \theta = \arcsin\left(\sin(\theta_{est}) - \frac{\lambda}{d}\right), & \theta_{est} > 0 \end{cases},$$

where $\theta$ denotes the mirrored AOA, $\theta_{est}$ denotes the estimated AOA, $\lambda$ denotes a wavelength of the wireless signal and d denotes a space between adjacent antenna elements of said wireless communication device's antenna array.

5. The wireless communication device of claim 3, wherein
   when the signal strength measurement for the wireless signal received at one of said two other wireless communication devices is higher than the signal strength measurement for the wireless signal received at the other of said two other wireless communication devices, the comparison of the acquired signal strength measurements indicates that the wireless signal is from one side of the normal at which said one of said two other wireless communication devices is located.

6. The wireless communication device of claim 1, wherein said wireless communication device and said two other wireless communication devices respectively correspond to three sectors of a Radio Base Station (RBS) and the sectors corresponding to said two other wireless communications are respectively adjacent to the sector corresponding to said wireless communication device.

7. The wireless communication device of claim 1, wherein said antenna array is a Uniform Linear Array (ULA).

8. A Radio Base Station (RBS), comprising the wireless communication device according to claim 1.

* * * * *